United States Patent [19]

Ito et al.

[11] 4,258,005
[45] Mar. 24, 1981

[54] THERMAL REACTOR WITH FLUIDIZING ROTORS

[75] Inventors: Kanichi Ito, Yokohama; Yoshio Hirayama, Zushi; Yoshiki Kuroda, Fujisawa, all of Japan

[73] Assignee: Ebara Corporation, Tokyo, Japan

[21] Appl. No.: 90,073

[22] Filed: Oct. 31, 1979

[30] Foreign Application Priority Data

Oct. 31, 1978 [JP] Japan ............... 53-134275

[51] Int. Cl.³ ............... B01J 8/36; B01J 8/38; F23G 5/00; F26B 21/00
[52] U.S. Cl. ............... 422/143; 34/57 C; 34/57 D; 48/111; 110/245; 165/104 F; 201/31; 406/90; 432/58
[58] Field of Search ............ 422/143, 145, 147; 34/57 C, 57 D; 110/245; 165/104 F; 48/111; 201/31; 432/15, 58; 406/70, 90

[56] References Cited

U.S. PATENT DOCUMENTS

| 3,411,465 | 11/1968 | Shirai . | |
|---|---|---|---|
| 3,484,948 | 12/1969 | Whelan | 34/57 C |
| 3,829,983 | 8/1974 | White | 422/143 |
| 3,939,782 | 2/1976 | Albrecht | 34/57 C |
| 4,129,411 | 12/1978 | Moss | 406/70 |

FOREIGN PATENT DOCUMENTS 49-14182  4/1974  Japan .

OTHER PUBLICATIONS

"Fluidization Engineering", pp. 82–87, Kunii et al., 1969.

Primary Examiner—Bradley Garris
Attorney, Agent, or Firm—Wenderoth, Lind & Ponack

[57] ABSTRACT

A novel thermal reactor or incinerator of a fluidized bed type is provided wherein residua which have descended to the bottom of the fluidizing bed are transferred to a discharge opening by a plurality of hollow cylindrical rotors disposed above the bottom plate of a vessel of the reactor or incinerator, each of the rotors being provided with a plurality of perforations in the cylindrical wall through which gas or air is injected into inert solid or sand particles to form the fluidized bed.

6 Claims, 6 Drawing Figures

THERMAL REACTOR WITH FLUIDIZING ROTORS

FIELD OF THE INVENTION

The present invention relates to a thermal reactor and more particularly to a thermal reactor incorporating a fluidized bed which is suitable for incinerating or heat-decomposing municipal waste or the like.

BACKGROUND OF THE INVENTION

Disposal of municipal waste is now becoming a serious problem due to the huge volume thereof which has been increasing from year to year.

Incineration is one of the ways for disposing the refuse and waste.

In the conventional burning apparatus or incinerator employing a fire grate, several problems have been encountered as summarized below.

(1) The plastics contained in the municipal waste melt and pass through the grate and are burnt around and beneath the grate whereby the grate is exposed to flame of high temperature and, thus, it is likely to be damaged at an early stage resulting in high maintenance cost. This problem is serious, since the proportion of plastics in the waste is relatively high and is increasing.

(2) Municipal waste comprises several kinds of materials which are not uniformly mixed and, therefore, respective constituents of the waste exhibit different burning characteristics which may create spots of extraordinarily high temperature within the incinerator during the incineration and, thus, tend to damage the wall of the combustion chamber. Also, such local high temperature is likely to generate NOx, thus, creating a problem of pollution.

(3) In the burning of solid materials, it is generally the heat-decomposing stage in the beginning thereof which requires heat-absorption and heat-transferring speed is relatively low thereby generally necessitating a fire grate having large surface area.

The fire grate is generally expensive due to its associated members such as means for effecting movement thereof and employment of a large grate naturally results in the necessity of a large incinerator and, accordingly, the expenses required for installation of the incinerator will be increased.

In order to solve the problems above, an incinerator of the fluidizing type has been utilized which employs inert solid particles as medium for forming a fluidized bed. The inert solid particles used are generally sand grains and, therefore, the term "sand grains" and/or "sand" is conveniently used in the present description in the sense that it is not limiting to "sand" but also covers any particles or grains suitable for forming the fluidized bed. The incinerator of the fluidized type is advantageous in the following points. (a) The liquified plastics or the like are heat-decomposed in the fluidized bed and burnt therein and, thus, possibility of damaging a gas diffusion plate corresponding to the fire grate in the apparatus touched upon above is obviated since such the plate is not subjected to the flame of the burning plastics. (b) Since the temperature in the fluidized bed is maintained substantially uniform, there is no problem derived from high temperature spots within the incinerator. (c) The heat transferring rate between the sand grains and the materials is quite large thereby making it possible to utilize a bed plate of relatively small surface area in the combustion chamber which makes it possible to have a compact sized incinerator thus lowering the installation cost of the apparatus.

The conventional incinerator of the fluidized bed type is, thus, quite useful for incinerating municipal waste or the like. However, it is necessary in such incinerators that the materials to be incinerated do not descend to the bottom of the fluidized bed. This is because, if the materials to be burnt decend to the bottom of the fluidized bed, the perforations in the diffusion plate will be closed whereby fluidization above the closed portion would be deactivated and sand grains in that portion will merge into a mass with the result that fluidization is insufficient or even formation of the fluidized bed becomes impossible.

Therefore, it is necessary to pulverize the materials to be incinerated in the apparatus of the fluidized bed type to below a certain particle size, usually with the range of from 50 mm to 70 mm. However, municipal waste or the like comprises several kinds of materials each having a different resistance to pulverization. For instance, brittle materials such as glass, potteries, ceramics and concrete are easily pulverized or crushed upon receiving impact thereon while tenacious materials such as rubber and plastics are not easily pulverized unless they are subjected to shearing action by use of sharp edges or the like. Therefore, if it is desired to pulverize the municipal waste which is a mixture of several kinds of refuse to grains reduced in size below a certain preferable value by a single apparatus, the apparatus suitable for such purpose must be capable of pulverizing as well as shearing. However, the edges required for shearing function are easily and quickly worn or damaged by the brittle materials such as glass, potteries, ceramics, concrete etc. or materials such as metals having high resistance against shearing action. Accordingly, it is difficult to pulverize municipal waste by a single apparatus to a degree satisfactory for incinerations in the conventional incinerator of the fluidized bed type.

Therefore, under such situation as above, in practice, the municipal waste is pulverized first by using an apparatus primarily adapted for pulverizing. Then the pulverized brittle materials are sorted out by sieving, etc. and the ferrous materials are magnetically removed. Thereafter, the remainder of the waste is shredded by another apparatus having sharp edges and primarily adapted for shearing and/or shredding functions. Therefore, the steps performed before the incineration have been more or less complex.

As explained above, the size reducing or regulating step before the incineration has been considered to be one of the most important problems to be solved when incineration of municipal waste is performed in a conventional incinerator of the fluidized bed type.

Therefore, it has been desired to simplify or eliminate the complex pre-processing required for incinerating the combustible constituents of municipal waste.

SUMMARY OF THE INVENTION

Accordingly, one object of the present invention is to provide a thermal reactor or incinerator which is free from the drawbacks discussed above.

It is also an object of the present invention to provide a thermal reactor of the fluidized bed type wherein materials are prevented from reaching the bottom of the fluidized bed.

It is still another object of the present invention to provide an incinerator of the fluidized bed type wherein non-combustible residua are effectively discharged outwardly of the incinerator.

In accordance with the present invention, a novel reactor or incinerator of the fluidized bed type is provided which is adapted to incinerate materials to be incinerated, particularly the municipal waste or the like without need of the troublesome size regulating step heretofore required in the conventional incinerator of the fluidized bed type.

The terms "(thermal) reactor" and "incinerator" used herein is to be understood to indicate a vessel in which incineration, combustion, partial oxidation, gasification, pylolysis, calcining or catalysis is taking place since the reactor according to the present invention is particularly suitable for disposing of municipal waste or the like, the usage thereof is not limited to only such purpose and it is widely used for thermal reactions.

The reactor or incinerator according to the present invention is provided with a discharge opening leading to a fluidizing and transferring means just above the bottom surface of the incinerator and a plurality of parallel hollow cylindrical rotors constituting the fluidizing and transferring means and disposed above the bottom surface with a predetermined space between the respective adjacent rotors, said rotors being arranged to rotate in the same direction to facilitate discharging the residua and each thereof being provided with a plurality of air or gas injecting perforations to form a fluidized bed.

The predetermined space is determined so as to prevent the materials from passing through the space between the rotors. The bottom plate of the incinerator is generally constructed so as to be a diffusion plate having a plurality of injecting holes or perforations, the perforations being arranged to inject gas or air flow with a component vector in the direction towards the discharge opening so as to discharge the residua therethrough as well as to assist the formation of the fluidized bed.

In some of the embodiments, according to the present invention, a blocking bar is disposed in each of the spaces between adjacent rotors so as to effectively prevent the materials from passing downwardly through the space between the adjacent rotors. In this case, the perforations in the bottom plate may be eliminated.

The other objects and advantages of the present invention will be made more clear when the detailed description is reviewed referring to the accompanying drawings a brief description of which is given below.

DESCRIPTION OF PREFERRED EMBODIMENTS

Figure 1:
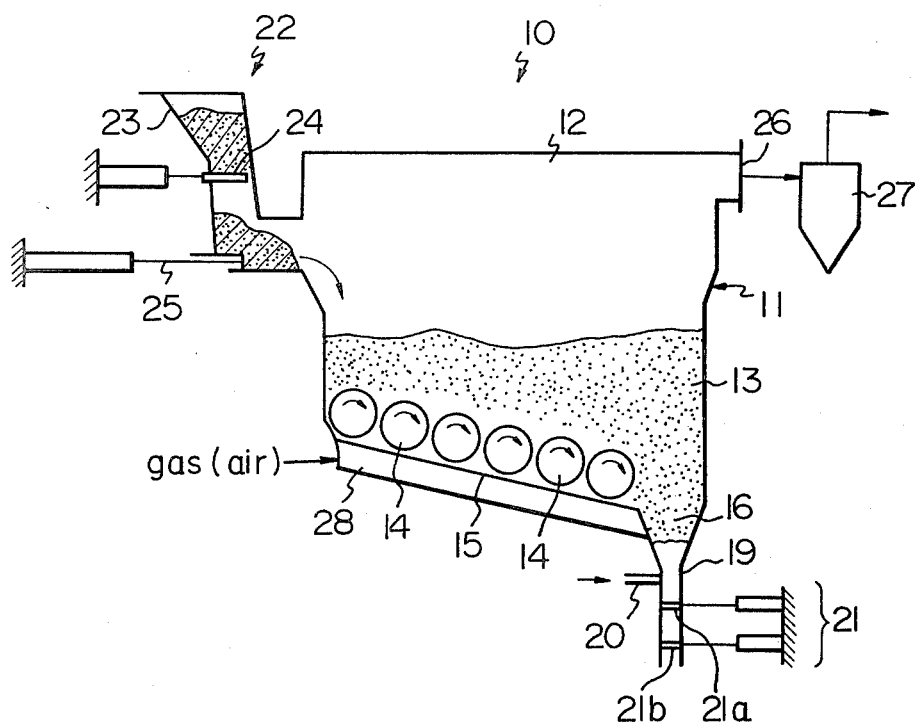
FIG. 1 is a schematic illustration of a preferred embodiment of the present invention in a cross-sectional side view accompanying associated equipments.

Referring to FIG. 1, there is shown, generally in a cross-section, a preferred embodiment of a thermal reactor 10 according to the present invention which comprises a furnace vessel 11. The inside of the vessel 11 is generally divided into an upper portion referred to as a free board 12 and a lower portion referred to as a fluidized bed 13. The fluidized bed 13 is formed by inert solid particles or grains of sand fluidized by the upwardly injected gas or air. In order to provide injection of the gas or air for fluidizing said sand grains, a plurality of hollow cylindrical rotors 14 are parallely arranged above a bottom plate 15 of the vessel 11 which is preferably inclined and lead to a discharge opening 16. Each of the rotors 14 is spaced by a predetermined distance from the adjacent rotors, respectively and adapted to rotate in the same direction as indicated by an arrow, respectively by a suitable driving mechanism and provided with a plurality of perforations 17 (FIG. 2) in the cylindrical wall thereof through which gas or air is injected into the sand, the gas or air being supplied from a supply source to the hollow cylindrical rotors 14 through rotatable couplings. The gas or air injected into the sand forms the fluidized bed 13 while rotation of the rotors 14 effects movement of residua towards the discharge opening 16 whereby the rotors constitute a fluidizing and transferring means of the reactor or incinerator 10. In the bottom plate 15, there are also provided a plurality of holes 18 through which gas or air is injected upwardly to assist the fluidization and incineration.

The series of rollers 14 terminates adjacent the discharge opening 16 which is gradually reduced downwardly in its cross-sectional area and coupled with a discharge pipe 19 to which an injection pipe 20 is connected.

Gas or air is injected through the pipe 20 into the discharge pipe 19 with proper flow rate determined to fluidize the sand grains in the discharge opening 16 and the pipe 19. Below the junction of the pipes 19 and 20, a double valve 21 is disposed in the pipe 19 so as to alternately open and close two valve ports 21a and 21b to conveniently discharge the uncombustible residua fed to the discharge opening 16 and the discharge pipe 19. The sand in the discharge pipe 19 may be removed outwardly through the double valve 21 together with the residua and the sand separated from the residua may be returned to the combustion chamber in the vessel 11.

A feeder 22 for supplying the materials to be incinerated to the reactor 10 comprises a hopper 23, a gate 24 and pusher 25 and the feeder 22 is communicated with the free-board 12 of the reactor 10. Also, at the upper position of the vessel 11, a vent opening 26 is provided for discharging the exhaust gas outwardly through a dust collector 27 by which ashes contained in the exhaust gas are trapped.

With the thermal reactor or incinerator 10 constructed as above, municipal waste may be charged into the reactor 10 through the feeder 22 as collected substantially without any pre-treatment or by just merely opening or breaking the trash bags. The refuse of relatively light materials and small refuse float within the fluidized bed 13 and are incinerated and refuse of relatively heavy materials descends to the bottom of the fluidized bed 13. The combustible materials which descend to the bottom are also subjected to the fluidizing action of the sand moving with relatively high speed and, thus, are effectively incinerated whereby the possibility of blocking the perforations 17 by fused or molten plastics or the like is substantially obviated in contrast to the case when the fire grate type is employed for incineration while the surface area of the bottom plate is made smaller relative to that required in the fire grate type.

The heavy materials which descend to the bottom of the fluidized bed 13 are sequentially transferred towards the discharge opening 16 by virtue of the rotating cylindrical roters 14 and, during such gradual movement of the materials, the combustible constituents thereof are fully incinerated by the effect of the fluidizing bed 13 and only the uncombustible residua are discharged outwardly through the discharge opening 16, pipe 19 and double valve 21.

The flow of gas or air downwardly injected from the perforations 17 of the rotors 14 during the rotation thereof is interfered with by the bottom plate 15 and fluidizes the sand which has fallen below the rotors and delivers the same upwardly when the gas or air is injected upwardly through the space between the rotors 14. This gas or air flow also effectively prevents the sand in the fluidized bed 13 from falling and piling up on the bottom plate 15.

Figure 2:
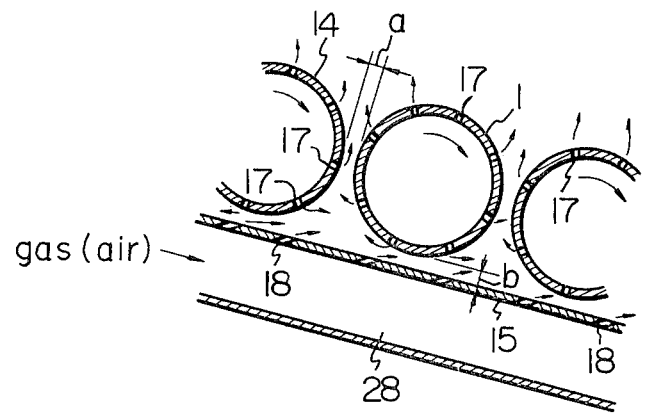
FIG. 2 is a part of the apparatus shown in FIG. 1 in an enlarged scale which illustrates the construction of the rotors used in the present invention.

As illustrated in FIG. 2, the bottom plate 15 is provided with a plurality of perforations 18 as explained before through which gas or air is injected upwardly from a duct 28 to assist the fluidization and delivers the sand which has fallen below the rotors 14 upwardly into the bed 13.

Each axis of the perforations 18 is inclined so that the injection air or gas passing through the perforations 18 is given a component vector towards the discharge opening 16 thereby assisting and ensuring the transfer of the sand and uncombustible residua on the bottom plate in the direction towards the discharge opening 16.

The distance "a" between the respective adjacent rotors 14 and the distance "b" between the rotors 14 and the bottom plate 15 are preferably arranged so that "b" is greater than "a" whereby the possibility of clogging the space "b" by the materials passed through the space "a" is reduced or eliminated.

Figure 3:
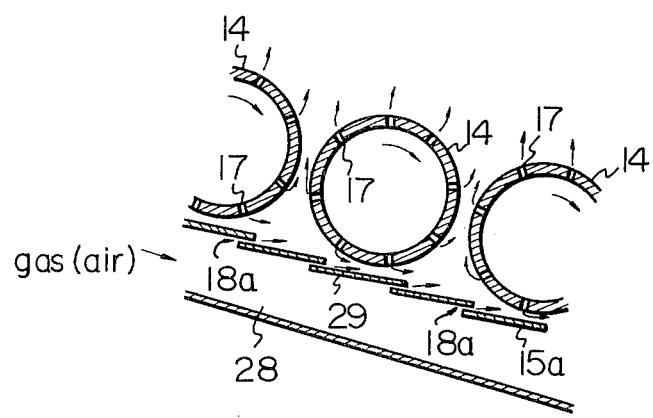
FIG. 3 is an illustration similar to that shown in FIG. 2 illustrating a modified bottom plate in the vessel of the reactor.

In FIG. 3, there is illustrated a part of another embodiment according to the present invention. In this embodiment, the bottom plate 15a is constructed by a plurality of strip sheets 29 partially overlapping each other so as to form passages 18a between the adjacent strips 29, respectively, the passages 18a serving the same function as that of the perforations 18 shown in FIG. 2.

Although the bottom plates 15 or 15a illustrated in FIGS. 1, 2 and 3 are shown as inclined, they may be disposed horizontally provided that the movement of the uncombustible residua and the sand towards the discharge opening is effected.

The thermal reactors illustrated in FIGS. 1, 2 and 3 exhibit satisfactory performance; however, some further modifications may be preferable to improve the characteristic features of the reactors because of the following reasons.

(i) Uncombustible residua which might or might not have merged into a mass and is moving over the rotors may be caught in the gaps between the rotors thereby causing troubles such as large variation in the load imposed on the driving means for rotating the rotors or overloading of the driving means. Under such condition, an additional operation for pulverizing the waste may solve such troubles, however, such an additional step is, of course, not preferable in view of the objects of the present invention.

(ii) The injecting gas or air may cause impingement of sand on the cylindrical surface of the rotating rotors and this may promote abrasion of the rotor and/or granulation of the sand thereby resulting in an increase in the consumption of the sand and in the quantity of dust discharged from the reactor thus increasing the operational expenses and causing the problem of pollution.

(iii) When the supply of fluidizing gas or air is stopped, sand may enter into the hollow cylindrical rotor and pile up therein or clog the perforations in the rotors thereby causing variation in the flow of the gas or air being injected. Accordingly, satisfactory fluidization is hindered thereby and the capacity of the reactor is lowered and the possibility of producing clinkers is encountered.

These drawbacks are solved in the further embodiments according to the present invention.

Figure 4:
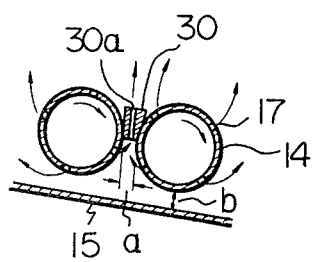
FIG. 4 also shows a part of the modified reactor incorporating blocking bars adjacent the rotors.

In FIG. 4, a sideview of part of another embodiment of the reactor or incinerator according to the present invention is illustrated. In this embodiment, a blocking bar 30 is disposed parallel to the axes of the rotors 14 and above each of the gaps(a) between the adjacent rotors 14, respectively. The bar 30 is shaped to have a cross-section conforming to the shape of the upper portion of the gap, for instance somewhat similar to an inverted trapezoid and extends parallel to the axes of the rotors over substantially the axial length of the rotor 14. The blocking bar 30 may merely be disposed in the gap between the adjacent rotors or mounted at the opposite ends thereof on the wall of the vessel 11. Alternately, the blocking bar 30 may be supported by studs (not shown) mounted on the bottom plate 15. The provision of the blocking bars 30 effectively prevents the uncombustible residua (which might have merged into a mass) from entering into the gaps between the rotors 14. The fluidizing gas or air discharged into the space below the blocking bars 30 and rotors 14 flows upwardly through the gaps between the rotors 14 and the blocking bars 30. Since the gaps are narrowed by the bars 30 or closed when the bars 30 are not supported and disposed on the adjacent the rotors, the velocity of the gas or air passing the gaps may become too great.

The provision of an appropriate number of perforations 30a extending substantially vertically through the bars 30 may relieve the severe condition induced by the fluidizing flow passing such gaps upwardly. Also, the perforations 18 or 18a in the bottom plate 15 or 15a (FIGS. 2 and 3) may be omitted when the perforations 30a are provided though the provision of the perforations 18 or 18a in the bottom plate 15 or 15a is not a mandatory requirement.

The blocking bars 30 explained above effectively prevent the uncombustible residua (which might have either merged into a mass or not) from being entrapped in the gaps between the rotors 14.

Figure 5:
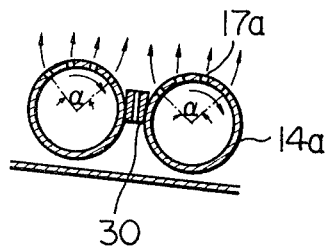
FIG. 5 is a further modified form of the rotor.
Figure 6:
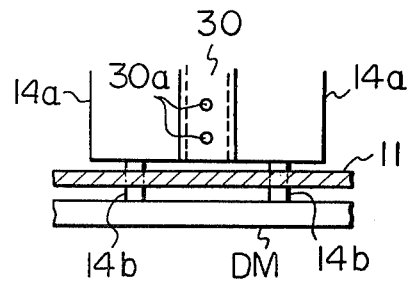
FIG. 6 is a plan view of that shown in FIG. 5 and schematically illustrates the driving mechanism suitable for the rotors shown in FIG. 5.

In FIG. 5, a further modified form of the rotors 14a is illustrated. In this rotor 14a also, a plurality of perforations 17a are provided in the cylindrical wall of the rotor so as to inject the gas or air from inside of the rotor to outside to form the fluidized bed. However, the position of the perforations 17a on the cylindrical surface of each of the rotors 14a is limited to a certain region defined between two axial lines on that surface. In other words, the two axial lines define a rectangular region as viewed from the direction transversing the two axial lines. The two lines form an angle "α" relative to the central axis of the rotor 14a as viewed in FIG. 5. Further, a driving mechanism (DM) suitable for rotating the rotors 14a explained above is schematically illustrated in FIG. 6. When the rotors 14a in FIG. 5 are employed, it is preferable to maintain the same phase of the limited regions having perforations 17a over all of the rotors 14a because of the reasons explained hereunder. As schematically illustrated in FIG. 6, the driving mechanism (DM) in this case is coupled with all of the rotors 14a so that the respective phases of the limited regions are maintained the same during the rotation of the rotors. Such driving mechanism usually comprises an endless chain trained over the sprockets mounted on the respective shafts 14b of the rotors 14a through other types of driving mechanism are also applicable and, thus, the driving mechanism according to the present invention is not limited to such combination of an endless chain and sprockets. Also, such driving mechanism is applicable to other reactors or incinerators illustrated in FIGS. 1 through 4.

By the arrangement of the perforations 17a in the limited regions in the respective cylindrical walls of the hollow rotors 14a and the regulation or equalizing of the phase each of the limited regions, it is possible to prevent or reduce the drawbacks caused by such as entering of the sand into the hollow rotors, impingement of sand on the rotors, granulation of the sand, etc. For instance, if the driving of the rotors is effected intermittently, the chance for abrading the surfaces of the rotors is reduced. In this instance, the limited regions of the respective rotors are arranged to face upwardly during the period when the rotors are temporarily stopped so that the gas or air injection is continued in the direction to maintain the fluidized bed. Also, such intermittent stoppage of the rotors reduces the chance that the sand fluidized by the injection gas or air from one rotor will impinge on the adjacent rotor thereby preventing the abrasion and/or wear of the rotor surfaces and granulation of the sand resulting in saving operational expense. Of course, the chance of the impingement of sand is reduced even during the continuous rotation due to the limited provision of perforations 17a.

On the other hand, when the reactor or incinerator is not under operation, (i.e. gas or air injection is not effected), the limited regions are arranged to face downwardly whereby entering of the sand into the hollow rotors is prevented.

Although, in FIG. 5, the blocking bar 30 is illustrated, it may be omitted as in those embodiments illustrated in FIGS. 1 through 3.

The angle "α" in FIG. 5 is preferably 120° but such angle is appropriately selected depending on the factors involved such as the materials to be incinerated, the type of incineration (incineration, combustion, partial oxidation, gasfication, pyrolysis, calcining or catalysis), the gaps between the rotors and the sand grains employed.

The thermal reactor or incinerator according to the present invention is constructed as explained above, the pre-treatment is substantially unnecessary in case of disposing the municipal waste or the like by incinerating thereof.

However, in order to recover the re-usable refuse contained in the municipal waste, pulverizing and sorting of the waste may be performed in advance of the incineration. Such pre-treatment or pre-processing is preferably performed by a suitable pulverizing apparatus such as disclosed in the U.S. Pat. Nos. 3,941,089; 3,973,735 and 4,076,177. During the pre-process in such a pulverizing apparatus as referred to above, garbage and waste paper, etc. are sorted out and the remainder generally comprises plastics, metals, cloth, etc. among which the volumetric ratio of the thin plastics is relatively high. Also, the metals are usually separated in the operation performed by the pulverizing apparatus referred to above. It has been found according to the experiments conducted that the light materials may not have to be pulverized since such materials as thin plastics, paper and cloth, etc. float within the fluidized bed and are easily incinerated without descending to the bottom of the fluidized bed. Further, the speed of the incineration with respect to the light materials referred to above depends mainly on the thickness of the light materials to be incinerated and therefore, pulverization of these light materials may not substantially increase the incinerating speed for these materials. If it is desired to incinerate the garbage and the paper after pulverization by the pulverizing apparatus referred to above, they are also easily incinerated in the reactor of the present invention since they have been already reduced in size. Thus, after such pre-treatment, the efficiency of the thermal reactor or the incinerator is improved since the ratio of the heavy materials descending to the bottom of the fluidized bed is relatively or remarkably reduced.

While the present invention has been explained in detail referring to the particular embodiments, the present invention is not limited to those explained and change and modification of the present invention are readily available to those skilled in the art within the spirit and scope of the present invention as defined in the claims appended hereto.

What is claimed is:

1. A thermal reactor of a fluidized bed type comprising:
    a vessel including a bottom plate provided with a discharge opening;
    A plurality of hollow cylindrical rotors disposed in parallel above said bottom plate with a predetermined space between the adjacent rotors, each of the rotors being provided with a plurality of gas injecting perforations in the cylindrical wall thereof with the inside space of the rotor being coupled with a gas source, all the rotors being arranged to rotate in the same direction; and
    a feeder for supplying materials into the vessel.

2. A thermal reactor as claimed in claim 1 wherein said bottom plate is provided with a plurality of gas injecting perforations.

3. A thermal reactor as claimed in claim 2 wherein said perforations in the bottom plate are arranged so that the injection gas flow therethrough has a component vector directed towards said discharge opening.

4. A thermal reactor as claimed in any one of claims 1, 2 or 3 wherein said bottom plate is inclined downwardly towards said discharge opening.

5. A thermal reactor as claimed in any one of claims 1, 2 or 3 wherein the gap between the bottom plate and the rotors is arranged to be greater than the gap between the adjacent rotors in said predetermined space.

6. A thermal reactor as claimed in claim 4 wherein the gap between the bottom plate and the rotors is arranged to be greater than the gap between the adjacent rotors in said predetermined space.

* * * * *